Dec. 13, 1966   R. A. HANSON   3,290,804
CONSOLIDATING APPARATUS
Filed April 3, 1964                5 Sheets-Sheet 1

INVENTOR.
RAYMOND A. HANSON
BY
Wells & St. John
ATTYS.

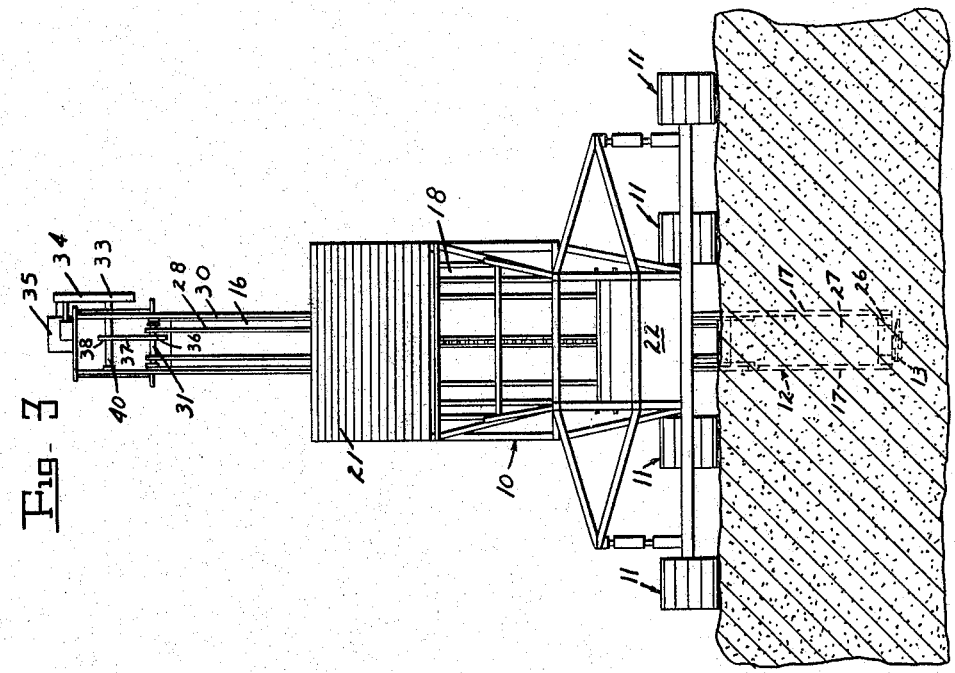
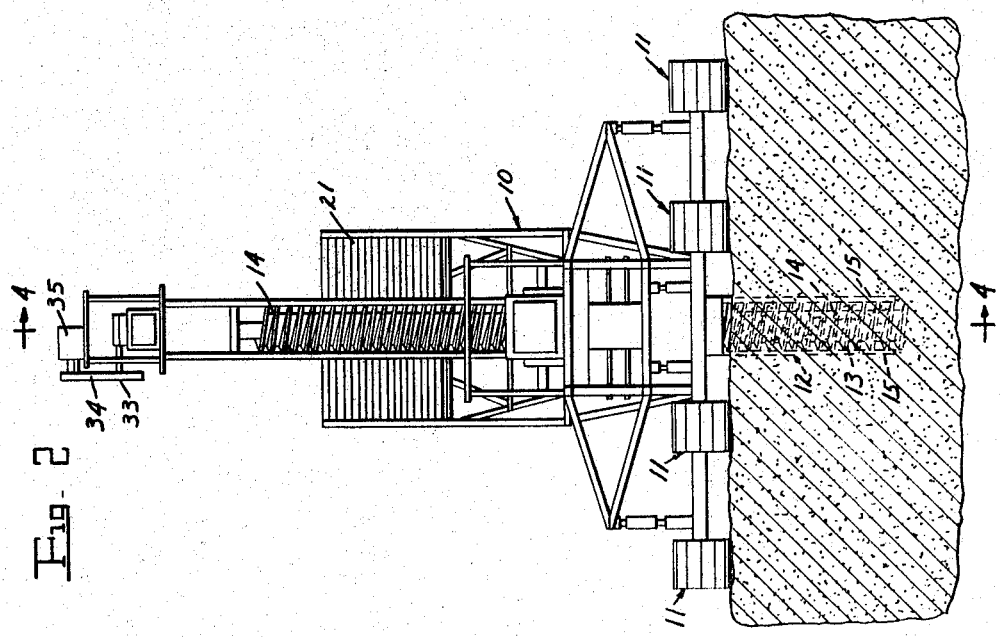

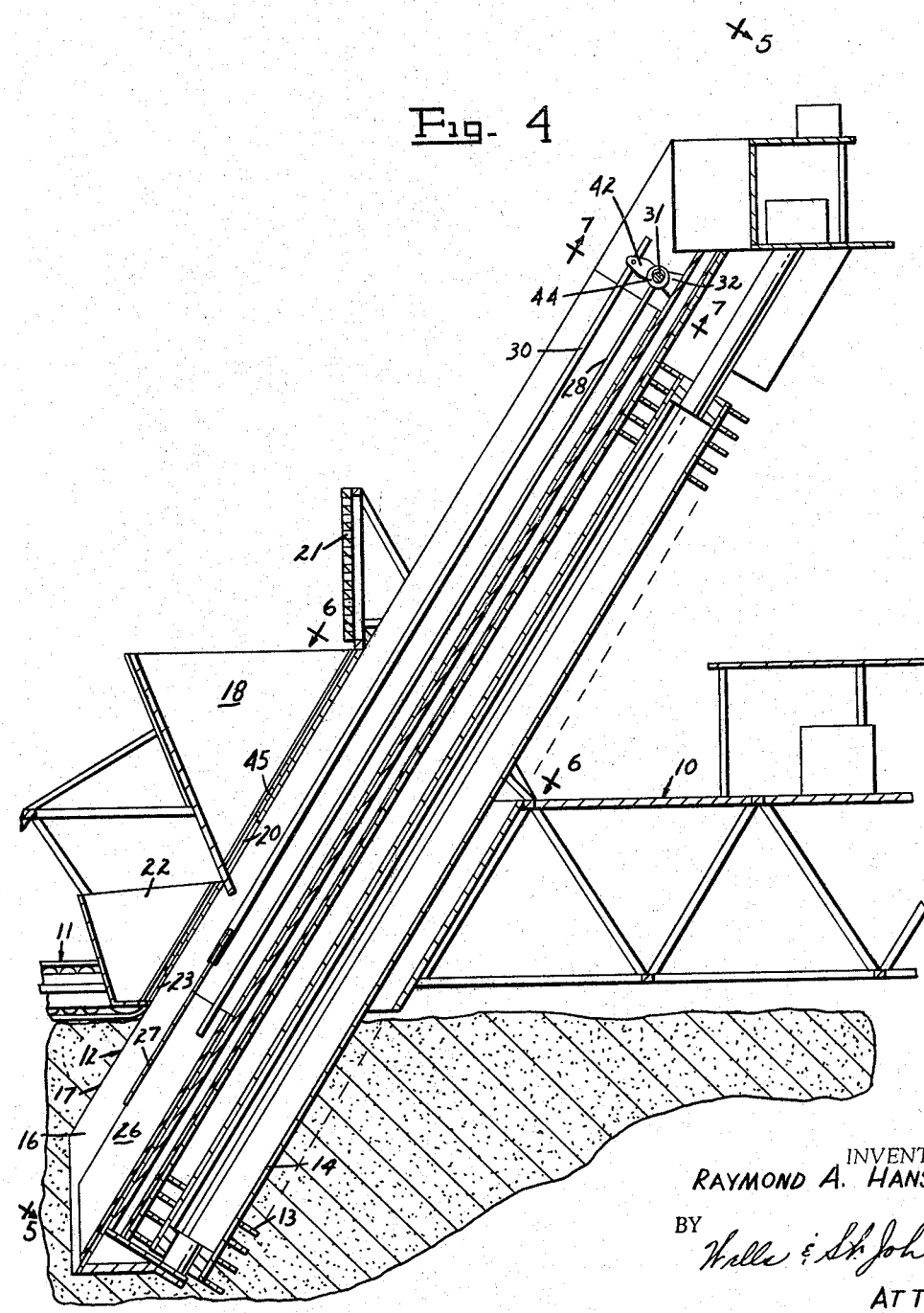

Dec. 13, 1966    R. A. HANSON    3,290,804
CONSOLIDATING APPARATUS
Filed April 3, 1964    5 Sheets-Sheet 4
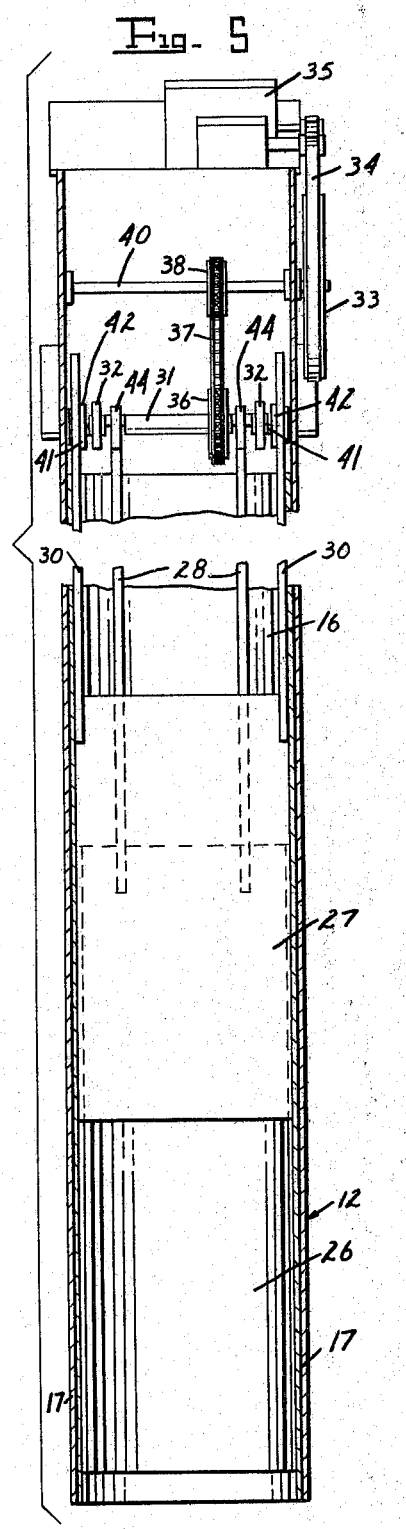
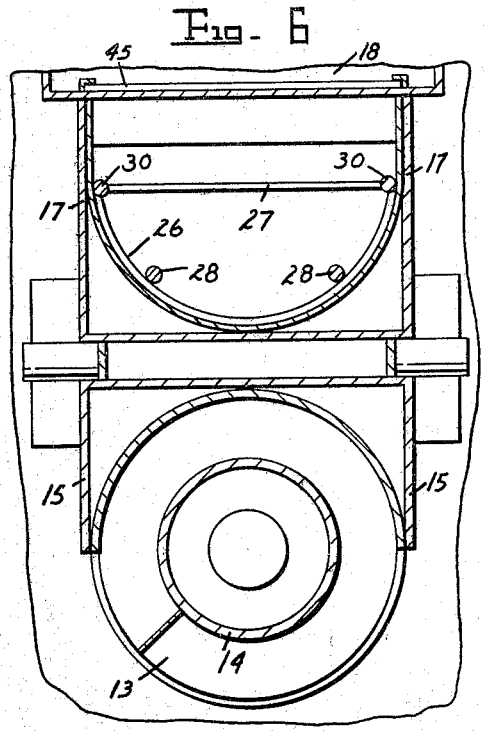
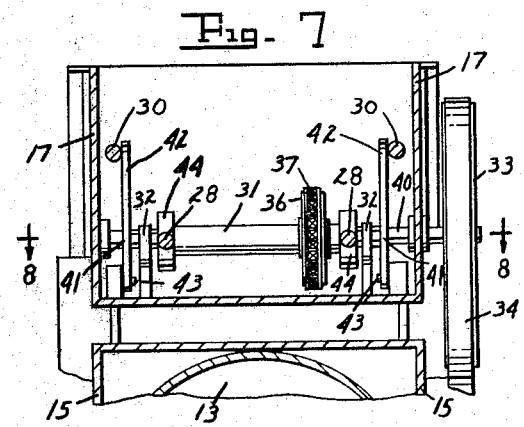
INVENTOR.
RAYMOND A. HANSON
BY *Wells & St. John*
ATTYS.

Dec. 13, 1966 R. A. HANSON 3,290,804
CONSOLIDATING APPARATUS
Filed April 3, 1964 5 Sheets-Sheet 5
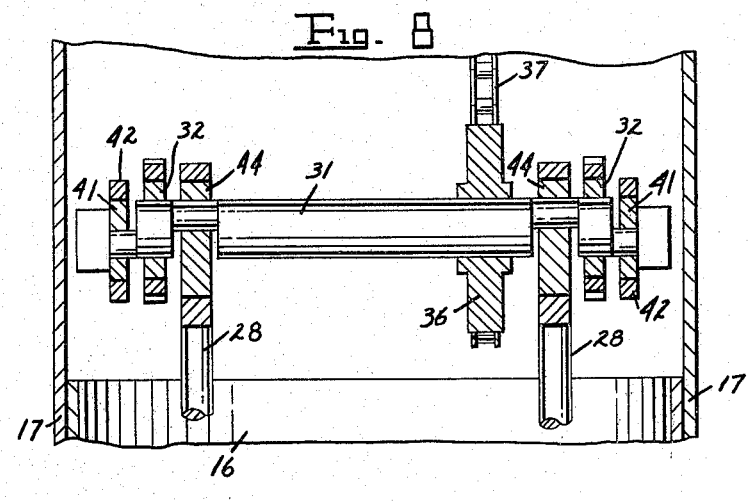
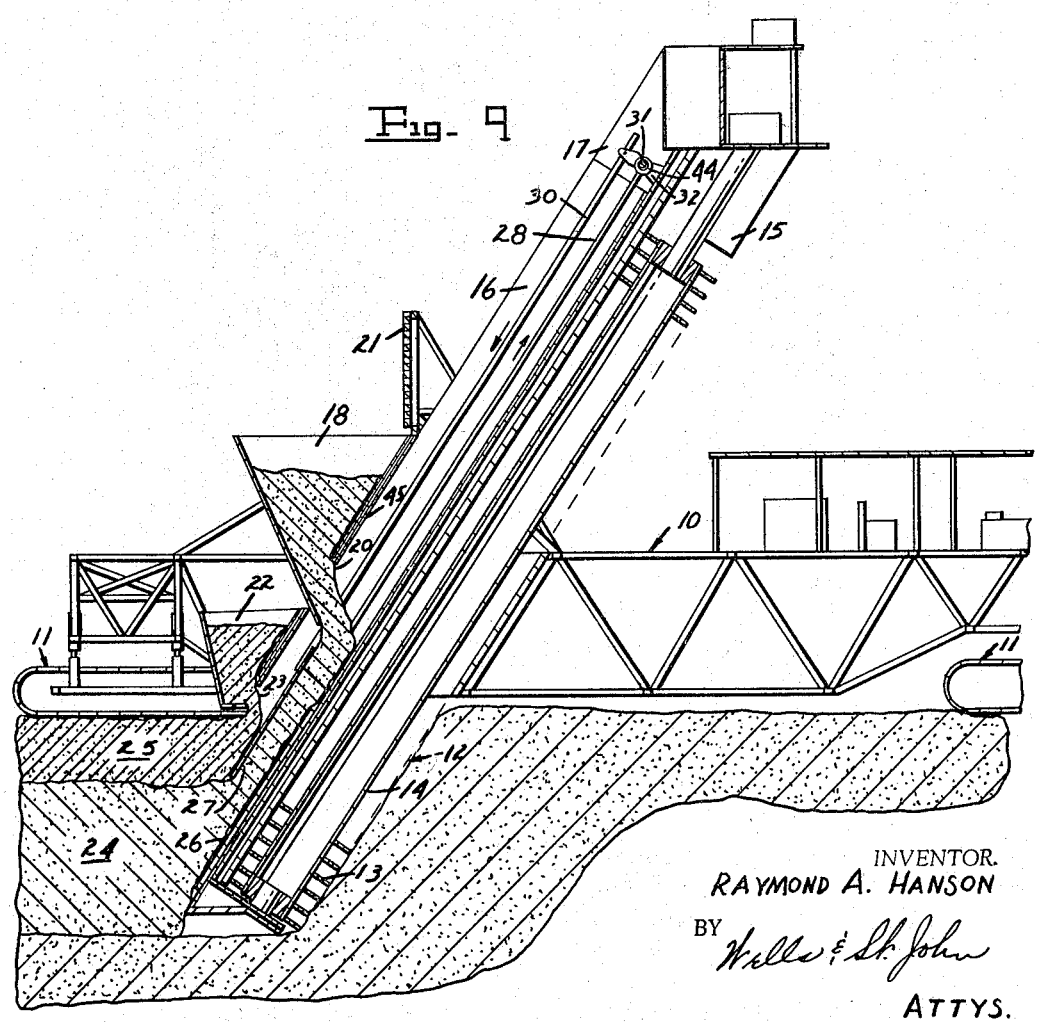
INVENTOR.
RAYMOND A. HANSON
BY
ATTYS.

3,290,804
CONSOLIDATING APPARATUS
Raymond A. Hanson, % R. A. Hanson Co.,
Palouse, Wash.
Filed Apr. 3, 1964, Ser. No. 357,133
7 Claims. (Cl. 37—81)

This invention relates to a consolidating apparatus for the filling of an open trench.

This invention relates to a consolidating apparatus for filling an open trench, particularly where the trench is to be filled by two or more layers of materials that are to be segregated from one another in separate strata. Such layering is desirable under certain conditions, such as the filling of a trench cut along the length of a dike, the trench being cut through the dike surface to solid foundation rock. In such a case the fill might include a lower strata of wet clay, capped by a layer of dry clay extending to the normal surface. The present device is adapted to maintain the two materials separately and to consolidate each layer as it is placed in the trench and also to securely consolidate the area at which the two layers abut one another in the trench.

It is a first object of this invention to provide such a consolidating apparatus that can be mounted within an open chute extended into the trench, so that the consolidating apparatus is fully enclosed by the protective walls of the chute, the walls being designed to prevent collapse of the trench prior to reception of the layered fill material.

Another object of this invention is to provide a plurality of interrelated consolidating elements to simultaneously consolidate the separate layers, and also to tamp and consolidate the areas at which the layers abut one another.

Another object of this invention is to provide such a structure in a simple mechanical relationship powered from a single crankshaft mounted on the chute that extends into the trench being filled.

These and further objects will be evident from a study of the following drawings, and also from the following detailed disclosure, which relate to a particular form of the invention, cited only as an example of its application to this type of machinery.

In the drawings:

FIGURE 2 is a front view of the machine shown in FIGURE 1;

FIGURE 3 is a rear view of the machine shown in FIGURE 1;

FIGURE 4 is an enlarged sectional view through the chute as seen along line 4—4 in FIGURE 2;

FIGURE 5 is a fragmentary view taken along line 5—5 in FIGURE 4 with the central portion of the apparatus broken away;

FIGURE 6 is a fragmentary sectional view on an enlarged scale taken along line 6—6 in FIGURE 4;

FIGURE 7 is an enlarged fragmentary sectional view taken along line 7—7 in FIGURE 4;

FIGURE 8 is an enlarged sectional view taken along line 8—8 in FIGURE 7; and

FIGURE 9 is a somewhat diagrammatic sectional view showing the intended operation of the apparatus in filling a trench.

Figure 1:
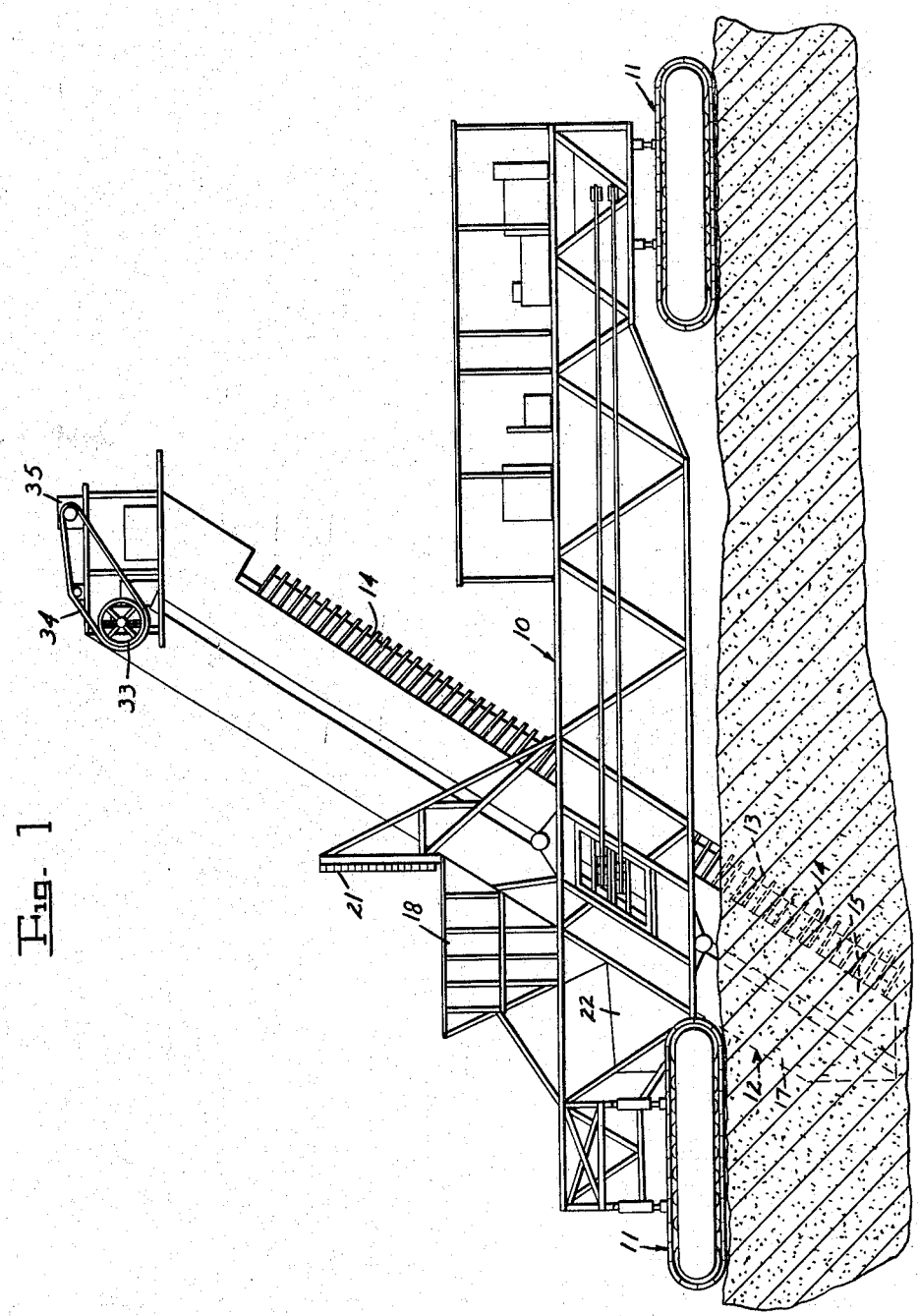
FIGURE 1 is an elevation view of a machine equipped with the present apparatus, the lower portions of the machine being shown in dashed lines and the surrounding soil being shown in section.

As seen in the drawings, a typical machine that might incorporate this invention is a device having an auger type of digging arrangement for digging a vertical trench through a ground surface through a sub-surface location, the digging element in this instance being vertically movable, although the apparatus that effects vertical motion of the element is not a part of the present invention and is not shown in detail in the drawings. Such a machine might be used for cutting a trench along a dike or dam, the trench being back-filled with consolidated fine material, to reinforce the surrounding earth structure.

The present apparatus is carried on a mobile supporting framework 10 which in turn is supported by front and rear track assemblies 11. The particular details of the framework 10 and the tracks 11 and the motors that propel the tracks 11 are not shown in the drawings and might incorporate any conventional type of assembly.

Slidably mounted in the framework 10 for motion along its own longitudinal axis is a shoe 12 that extends rearwardly and downwardly below the framework 10. At the front of the shoe 12 is rotatably journalled a parallel auger 13 mounted on a central shaft 14. The auger 13 is carried within side walls 15 of the shoe 12, the side walls 15 extending forwardly adjacent the maximum diameter of the auger 13. The auger 13 is powered for rotation about its central axis, so that rotation of the auger 13 will result in the forming of a rectangular trench below the framework 10 as the framework 10 travels to the right as seen in FIGURE 1. The forwardly extending walls 15 are designed to initially prevent collapse of the trench walls after cutting of the trench by passage of the rotating auger 13.

At the rear of the shoe 12 is a chute 16 having a U-shaped inside cross-sectional configuration that is open to the rear and to the bottom of the trench formed by the auger 13. The outside walls 17 of the chute 16 are co-planar with the walls 15 and form a rearward extension thereof, also being designed to facilitate the retention of the trench walls after they have been cut away by the auger 13.

Mounted on the framework 10 directly above the open end of the chute 16 is a first material receiving hopper 18 having a selectively openable bottom opening at 20 that is directed to the front inside wall of the chute 16. At the front of the hopper 18 is a vertical backstop 21 designed to prevent accidental reception of material directly into the chute 16 and to direct material from the incoming conveyor (not shown) into the hopper 18. Immediately below hopper 18 is a second hopper 22 having a bottom opening shown as 23. The rearwardly facing wall of the hopper 18 serves as a backstop for the hopper 22 to better direct material conveyed to the hopper 22. The hoppers 18 and 22 are designed to be periodically or continuously fed from larger storage facilities on mobile vehicles that either trail the framework 10 or ride alongside the framework 10, depending upon the particular circumstances.

As seen in FIGURE 9, the purpose of this apparatus is to cut a trench having the width of the auger 13 and the desired depth depending upon the vertical positioning of the shoe 12 relative to the framework 10. The trench is immediately filled within the chute 16 by a first layer of material 24 that is fed from the upper hopper 18 and a second layer of material 25 that is fed from the hopper 22. As an example, the ground material removed by the auger 13 might be loose rock, while the first layer 24 might be a wet clay capped by a second layer 25 of dry clay, the clay being made up of very fine particles and heavily consolidated so as to reinforce the surrounding rocky soil and thereby provide a greater resistance to erosion and water pressure.

In order to effectively pack the two layers of materials 24 and 25 within the trench, there is provided within the chute 16 a pair of consolidating elements designed to tamp and place the materials as desired in the open trench. The first of these elements is a curved plate 26 that is complementary to the inside configuration of the chute 16 and which is located adjacent the bottom end of the chute 16 as shown in FIGURES 4 and 9. The length of the curved plate 26 is somewhat greater than the maximum height of the desired first layer of material 24, so that the plate 26 will always extend through the first layer of material 24 regardless of the selected depth of the shoe 12.

The second consolidating element is the flat plate 27 that rests on the top or rear edges of the curved plate 26, overlapping the upper end of the curved plate 26 and extending upwardly therefrom. The plate 27 will sometimes extend the full length of the second layer 25 to the surface, but will always extend along the lower portion of the second layer 25 as can be seen in FIGURE 9.

Each of the plates 26 and 27 is designed to be reciprocated longitudinally relative to the chute 16 so as to tamp and consolidate the material being placed in the cut trench. This reciprocation is accomplished through connecting rods 28 and 30, respectively connected at their lower ends to the plates 26 and 27.

At the upper end of the chute 16 is a main crankshaft 31 which can be best seen in FIGURES 5, 7 and 9. The crankshaft 31 is carried on the shoe 12 by means of fixed bearings 32. Shaft 31 is rotated by means of a sprocket 36 and chain 37 driven by a second sprocket 38 on an idler shaft 40. The shaft 40 is turned by means of a large pulley 33 engaged by a belt 34 that is driven by a motor 35 located at the top of the chute 12 (see FIGURE 1). The rotation of the crankshaft 31 is constant, although variable speed controls might be provided for the motor 35 if this is desirable.

Directly outward from the bearings 32 on the shaft 31 are eccentric bearings 41 that carry outwardly extending cranks 42 pivotally connected at their lower ends to the shoe 12 about short pivot shafts 43. The upper ends of the cranks 42 are pivotally connected to the upper ends of the rods 30 described above. Thus, rotation of the shaft 31 will result in reciprocation of the rods 30 in unison, the amount of travel of the rods 30 being increased due to the extended length of the pivotal connections of the rods 30 through the cranks 42.

Inwardly of the bearings 32 are oppositely located eccentric bearings 44 that are directly connected to the upper ends of the rods 28. The locations of the bearings 41 and 44 relative to the axis of the shaft 31 in bearings 32 are diametrically opposite, so that rotation of the shaft 31 will cause the rods 28 and 30, as well as the connected plates 26 and 27, to reciprocate oppositely relative to the stationary chute 16. Thus, as the curved plate 26 is traveling upwardly, relative to chute 16, the flat plate 27 will be traveling downwardly.

The operation of this consolidating device is rather simple, and it is not believed that all of the operating details of the digging and mobile machinery are required in order to understand the consolidating apparatus itself. The lower portion of the open U-shaped walls of chute 16 are first filled with the first layer of material 24 up to the desired depth. The flow of the material to the first layer 24 can be selectively controlled by varying the size of the opening 20 by moving a slidable gate 45, using conventional mechanisms of a hydraulic or a mechanical nature. The flow of the material from the hopper 18 is designed to be constant, since the entire machine is to operate at a constant speed relative to the ground through which the trench is being cut by the auger 13.

The second layer of material 25 is then fed onto the first layer from the hopper 22, and will flow downwardly along the rear portion of the chute 16. The separation of the materials is such that plate 27 will actually block the forward movement of the material from hopper 22 and segregate the two layers of material as they travel down the chute 16. The chute 16 will receive the two materials in two layers, and the forward or lower layer of material 24 will fall forward of the flat plate 27.

In order to provide the same separation at all depths of shoe 12, it is necessary to add additional plates across rods 30 directly above plate 27 so as to form an extension thereof in order to insure that the flat separating plate always extends across the opening 23 of hopper 22. At the same time, longitudinal adjustment of the connection between rods 30 and cranks 42 serves to properly locate the bottom edge of plate 27 in the trench. Thus, any depth of trench can be filled with any desired ratio of the two layers of material 24, 25.

This separation of material will result in the first layer of material 24 being tamped in place by the reciprocation of the curved plate 26, while the second layer of material 25 will be tamped in place by the reciprocation of the flat plate 27. The lower end of the flat plate 27 will pack both materials in a somewhat intermixed condition at the line at which the two layers 24 and 25 abut one another. The lower end of the curved plate 26 will pack the first layer of material 24 quite adequately against the bottom of the trench, eliminating air pockets and increasing the density of the material 24 at the bottom of the trench.

The described construction is exceptionally useful in tamping a lower layer of material 24 that tends to adhere to the chute 16 and plate 26. The reciprocation of plate 26 and opposite reciprocation of the adjacent plate 27 maintain the material 24 in motion and prevent it from building up on the machinery due to the various shear and mixing forces applied to it.

Basically, this invention is concerned with consolidating elements to segregate and pack the two layers of material as they are placed in the trench formed by passage of auger 13. Each layer is independently packed in place, and tamping of the layers is accomplished to a marked degree, particularly along the lower portion of each layer. In this manner the fill material is intensified and the possibility of future weakening of the fill due to collapse of pockets of less density than average is virtually eliminated.

Many modifications can be made in the manner by which the consolidating elements are reciprocated, or the manner in which the chute 16 is formed. For this reason, the specific construction shown in the drawings is not intended to limit the scope of the invention except as the invention itself is defined in the following claims.

Having thus described my invention, I claim:

1. In a device for backfilling a trench through a soil surface:

a supporting framework mounted on the soil surface for travel relative to the surface;

a walled chute mounted on said framework extending downwardly into the trench, the chute being open along its rear and having a downwardly and rearwardly directed front surface;

a first hopper mounted on said framework, including a bottom outlet directed at the front surface of said chute;

a first consolidating element slidably mounted on said chute along the front inside wall thereof adjacent to the bottom end of said chute;

a second consolidating element slidably mounted within said chute rearwardly adjacent to said first consolidating element, said second element extending across the width of said chute rearward of said first consolidating element;

a second hopper mounted on said framework below said first hopper, including a bottom outlet directed toward said second consolidating element within said chute;

and means on said chute operatively connected to said first and second consolidating elements adapted to reciprocate said elements longitudinally relative to said chute.

2. In a device for backfilling a trench through a soil surface:

a mobile supporting framework;

a walled chute mounted on said framework extending downwardly and rearwardly into the open trench, the chute having a rearwardly open U-shaped inside configuration;

a first hopper mounted on said framework and including a bottom outlet adjacent the forward inside surface of the chute adapted to direct material in a first layer adjacent to the inner chute walls;

a second hopper mounted on said framework and including a bottom outlet adjacent the rear of said chute, said second hopper being located below said first hopper and having an outlet adapted to direct material in a second layer adjacent to the first layer of material;

a first consolidating element comprising a curved plate complementary to the inside surface configuration of said chute and slidably mounted adjacent thereto for longitudinal motion relative to said chute;

a second consolidating element comprising a flat plate located rearwardly of the curved plate and slidably mounted within said chute for longitudinal motion relative thereto, said flat plate extending across the outlet of said second hopper;

and means on said chute operatively connected to said first and second plates adapted to reciprocate said plates longitudinally relative to said chute.

3. An apparatus as defined in claim 2 wherein said last-named means comprises:

a transverse crankshaft mounted across said chute adjacent the top end thereof, said crankshaft having first and second eccentric bearings formed thereon diametrically opposed to one another;

and connecting rod means operatively connected between said first and second bearings and said curved plate and flat plate, respectively.

4. An apparatus as defined in claim 2 wherein said curved plate extends from the bottom of the chute to a height above the desired elevation of said first material in the trench bottom.

5. An apparatus as defined in claim 2, further comprising:

trench digging means mounted at the forward outside surface of said chute, the side walls of said chute being sufficiently wide to span the sides of the formed trench and to prevent collapse of the trench walls prior to reception of the backfill materials.

6. In a device for backfilling a trench through a soil surface:

a supporting framework adapted to travel along the trench;

a walled chute mounted on said framework exending downwardly within the trench, the chute being open along its rear surface;

first material supply means including a material outlet directed into the chute;

a first consolidating element slidably mounted on the chute within the trench adjacent the bottom end of said chute for reciprocating longitudinal movement relative to said chute;

second material supply means including a material outlet directed into the chute below the outlet of said first material supply means;

and a second consolidating element slidably mounted on the chute within the trench for reciprocating longitudinal movement relative to said chute, said second consolidating element extending across the chute adjacent the material outlet of said second material supply means and rearward of said first consolidating element.

7. In a device for backfilling a trench through a soil surface:

a supporting framework adapted to travel along the trench;

a walled chute mounted on said framework extending downwardly within the trench, the chute being open along its rear surface;

first material supply means including a material outlet directed into the chute;

a first consolidating element slidably mounted on the chute within the trench adjacent the bottom end of said chute for reciprocating longitudinal movement relative to said chute;

second material supply means including a material outlet directed into the chute below the outlet of said first material supply means;

a second consolidating element slidably mounted on the chute within the trench for reciprocating longitudinal movement relative to said chute, said second consolidating element extending across the chute adjacent the material outlet of said second material supply means and rearward of said first consolidating element;

and drive means on said chute operatively connected to said first and second consolidating elements adapted to reciprocate them relative to said chute and oppositely relative to one another.

References Cited by the Examiner

UNITED STATES PATENTS

| 1,470,028 | 10/1923 | Parker. | |
| 1,814,094 | 7/1931 | Rhodes | 61—72.1 X |
| 2,738,745 | 3/1956 | Harpold | 61—72.1 |
| 3,083,542 | 4/1963 | Summers et al. | 61—72.5 |

FOREIGN PATENTS

| 499,453 | 1/1939 | Great Britain. |
| 31,585 | 12/1933 | Netherlands. |

ABRAHAM G. STONE, *Primary Examiner.*

WILLIAM A. SMITH III, *Examiner.*